United States Patent Office 3,147,399
Patented Sept. 1, 1964

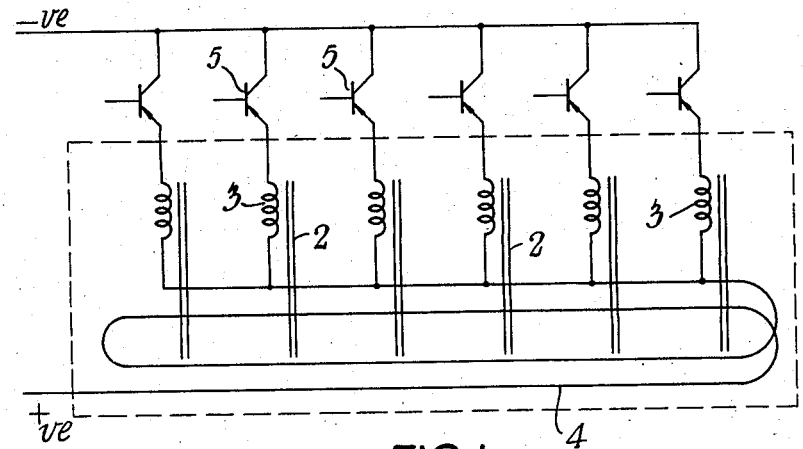
FIG.1
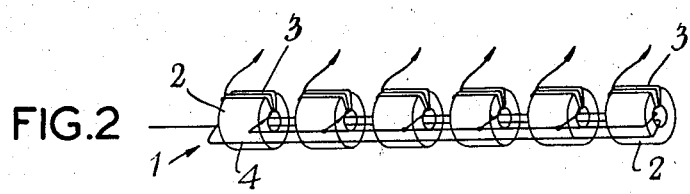
FIG.2
FIG.3
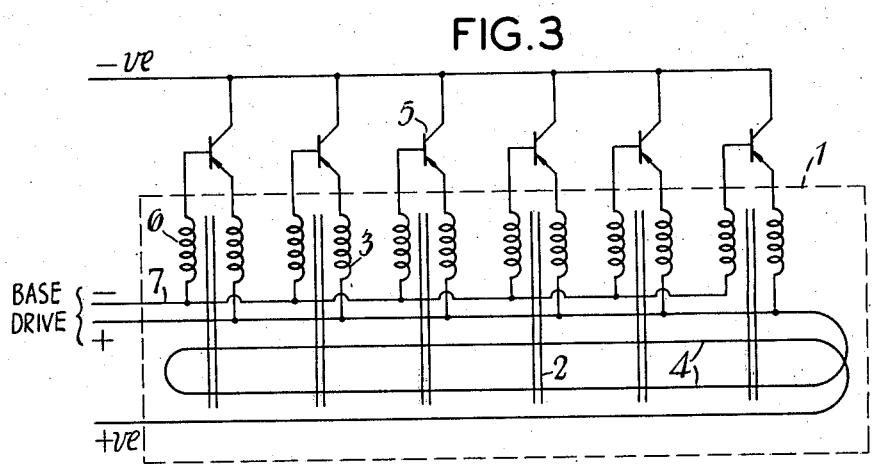

3,147,399
SAFETY DEVICES FOR ELECTRICAL SWITCHES
Derek W. Moore, Rexdale, Ontario, Canada, assignor to The De Havilland Aircraft Company Limited, Hatfield, Hertford, England, a company of Great Britain
Filed Apr. 27, 1962, Ser. No. 190,590
Claims priority, application Great Britain Apr. 27, 1961
7 Claims. (Cl. 317—11)

This invention relates to improvements in safety devices for electrical switches.

In many applications it is desirable to provide a number of electrical switches connected in parallel and arranged to be switched substantially simultaneously from the non-conducting or "OFF" condition to the conducting or "ON" condition and from the "ON" condition to the "OFF" condition. There is always a tendency for one or more of such switches to lag behind the others in the switching operation and, when the switches are switched from the "ON" to the "OFF" condition this results in a tendency for the last switch to carry all the current previously carried by all the switches. This is disadvantageous, particularly when the switches are of the semi-conductor type, e.g. transistors as there may be a tendency for the switch to break down and, even in the case of mechanical switches, is undesirable as the greatly increased current tends to produce arcing with its attendant disadvantages.

It is an object of the present invention to provide an improved safety device intended for use with parallel connected switches whereby the disadvantage referred to shall be materially reduced if not substantially obviated.

According to the present invention, a safety device for use with a plurality of parallel connected electrical switches comprises a separate core of magnetisable material for association with each switch, a switch winding on each core for connection in series with the associated switch and an oppositely wound control winding common to all the cores and electrically connected to each switch winding for electrical connection in series with each switch and associated switch winding, the number of turns of the switch windings and of the control winding being selected in relation to the characteristics of the core material and to a selected magnitude of current through each switch winding such that the ampere-turns of the control winding exceed the ampere-turns of each switch winding by an amount sufficient to drive each core into saturation when said current flows through all said switch windings and, when one or more of said switch windings cease to pass current, the cores associated with the other switch windings cease to be saturated.

The invention extends to a safety device according to the immediately preceding paragraph in combination with electrical switches connected one in series with each switch winding, the switches preferably being semi-conductor switches and, desirably, being transistors.

Where the switches are transistors, the switch windings are conveniently connected between the control winding and the emitter electrode of the associated transistor switch although the switch windings may be connected electrically to the collector electrode of the associated transistor switch.

Where the switch windings are intended to be connected to the emitter electrodes of transistor switches it is advantageous to provide a further winding on each core electrically connected between the control winding and the base electrode of the associated transistor, this further winding being so wound and having a number of turns such that the voltage at the base electrode will follow any changes of voltage appearing at the emitter electrode due to changes in the voltage induced in the switch winding and prevent the transistor being overloaded.

Some embodiments of the invention will now be described by way of example, reference being made to the accompanying drawings in which:

FIG. 1 is a circuit diagram of a safety device according to the invention associated with a plurality of transistor switches, FIG. 2 is a perspective view of the safety device of FIG. 1 and, FIG. 3 is a view similar to FIG. 1 illustrating a modification.

The safety device illustrated in FIGS. 1 and 2 is intended for use with six parallel connected transistor switches and in FIG. 1 is shown contained within the dotted rectangle 1. It comprises six similar cores 2 of magnetisable material, each core having a separate switch winding 3 wound thereon and a common control winding 4 wound oppositely to the switch windings 3 which are each connected at one end to the control winding 4 and at the other end to the emitter electrode of an associated transistor switch 5. The collector electrode of each transistor switch 5 is intended for connection to the pole of a D.C. source which is negative relative to that to which the control winding 4 is intended to be connected. For convenience the latter pole is shown as positive but it could be earth as will be understood.

In the operation of the device described, when all the switches 5 are conducting, the switch windings 3 carry substantially equal currents and the control winding 4 carries the whole current. The number of turns of the switch windings 3 and of the control winding 4 are selected in relation to the characteristics, e.g. magnetising force and coercivity of the core material and a selected magnitude of current through each switch winding 3 to be such that the ampere-turns of the control winding 4 exceed the ampere-turns of each switch winding 3 by an amount sufficient to drive each core 2 into saturation when said current flows through all the switch windings 3 and, when one or more of said switch windings ceases to pass current, the cores associated with the other switch windings cease to be saturated. Expressed mathematically, if $n$ is the number of transistor switches 5, $i$ is the minimum current of interest per switch device, $N_1$ is the number of turns of the control winding 4 and $N_2$ is the number of turns of each switch winding 3 then $inN_1$ must be greater than $iN_2$ by an amount sufficient to drive each core 2 into saturation. In this example, there are six transistor switches, each switch winding 3 has ten turns and the control winding 4 has two turns. If one or more of the transistor switches 5 are switched off, it will be seen that their associated cores 2 remain in saturation. The supply voltage tends to drive the full current through the remaining conducting transistor switches 5 but, by selecting $inN_1$, to be greater than $iN_2$ by an amount such that when one or more of the transistor switches 5 are switched off the cores 2 associated with the remaining conducting transistor switches 5 come out of saturation, a voltage is induced in the windings 4 of such cores which opposes any tendency for the current through the conducting transistor switches 5 to increase and in fact forces this current down. Whilst suitable selection of the circuit parameters may be made to ensure that when only one switch switches off the effect is observed in the remaining switches, it will be appreciated that in practice the majority of the switches switch off substantially simultaneously and it is usually only the slowest transistor switch 5 which requires the protection of the safety device of this invention.

Assuming a square loop core material, there is a tendency for a voltage to be applied to those switches 5 which have switched off, which voltage is of the order of $$\frac{N_1}{N_2 - N_1} \times V$$

where V is the supply voltage, and this tends to drive current through the emitter-base circuits of the transistors 5 whilst assisting current flow through that transistor 5 which is slow in switching off. There is not sufficient time available for the transistors 5 which have switched off to switch on again but the effect on the slow transistor 5 is disadvantageous and is overcome as shown in FIG. 3 by providing a base winding 6 on each core 2 wound in the same sense and having the same number of turns as the associated switch winding 3 and connected each between the associated base electrode of the associated transistor 5 and a common base-drive line 7 which is connected through a base-drive circuit (not shown) to the control winding 4. The effect of the base windings 6 is to cause the voltage at the base electrode to follow any change in the voltage appearing at the emitter electrode due to changes in the voltage induced in the associated switch winding 3 thereby opposing any tendency for the non-conducting transistors 5 to switch on and avoid any danger of the base-emitter inverse voltage limit being exceeded.

It will be appreciated that when the number of turns of the base winding 6 is the same as the number of turns of the associated switch winding 3 the base voltage is caused substantially completely to follow changes in the emitter voltage. As a certain magnitude of base-emitter inverse voltage can be tolerated it will be appreciated that the base winding 6 need not necessarily have the same number of turns as the associated switch winding 3.

I claim:

1. A safety device for use with a plurality of parallel connected electrical switches comprising a separate core of magnetisable material for association with each switch, a switch winding on each core for connection in series with the associated switch and an oppositely wound control winding common to all the cores and electrically connected to each switch winding for electrical connection in series with each switch and associated switch winding, the number of turns of the switch windings and of the control winding being selected in relation to the characteristics of the core material and to a selected magnitude of current through each switch winding such that the ampere-turns of the control winding exceed the ampere-turns of each switch winding by an amount sufficient to drive each core into saturation when said current flows through all said switch windings and, when one or more of said switch windings cease to pass current, the cores associated with the other switch windings cease to be saturated.

2. A device according to claim 1 in combination with electrical switches connected one in series with each switch winding.

3. A device according to claim 2 wherein the switches are semi-conductor switches.

4. A device according to claim 3 wherein the switches are transistors.

5. A device according to claim 3 wherein the switch windings are connected between the control winding and the emitter electrode of the associated transistor switch.

6. A device according to claim 5 wherein a further winding is provided on each core and electrically connected between the control winding and the base electrode of the associated transistor, this further winding being so wound and having a number of turns such that the voltage at the base electrode will follow any change of voltage appearing at the emitter electrode due to changes in the voltage induced in the switch winding and prevent the transistor being overloaded.

7. A device according to claim 6 wherein each further winding is wound on the associated core in the same sense as the associated switch winding and has the same number of turns as the associated switch winding.

No references cited.